United States Patent
Talvensaari et al.

(10) Patent No.: US 10,298,965 B2
(45) Date of Patent: *May 21, 2019

(54) SELECTION OF A CONTENT SOURCE BASED ON PERFORMANCE DATA

(71) Applicant: WOWZA MEDIA SYSTEMS, LLC, Golden, CO (US)

(72) Inventors: Michael Dean Talvensaari, Los Gatos, CA (US); James S. Sherry, Broomfield, CO (US)

(73) Assignee: WOWZA MEDIA SYSTEMS, LLC, Golden, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/000,692

(22) Filed: Jun. 5, 2018

(65) Prior Publication Data
US 2019/0028740 A1 Jan. 24, 2019

Related U.S. Application Data

(63) Continuation of application No. 15/653,184, filed on Jul. 18, 2017, now Pat. No. 10,021,429.

(51) Int. Cl.
| | |
|---|---|
| H04N 21/262 | (2011.01) |
| H04N 21/23 | (2011.01) |
| H04L 29/08 | (2006.01) |
| H04L 12/26 | (2006.01) |
| H04N 21/24 | (2011.01) |
| H04N 21/462 | (2011.01) |
| H04L 29/06 | (2006.01) |
| G06F 16/24 | (2019.01) |
| G06F 16/435 | (2019.01) |
| H04L 12/24 | (2006.01) |

(52) U.S. Cl.
CPC .......... *H04N 21/23* (2013.01); *G06F 16/24* (2019.01); *G06F 16/435* (2019.01); *H04L 29/06* (2013.01); *H04L 41/5009* (2013.01); *H04L 43/0888* (2013.01); *H04L 65/60* (2013.01); *H04L 67/10* (2013.01); *H04L 67/104* (2013.01); *H04N 21/2402* (2013.01); *H04N 21/4622* (2013.01)

(58) Field of Classification Search
CPC . H04L 41/5009; H04L 43/0852; H04L 43/08; H04L 29/06
See application file for complete search history.

(56) References Cited

U.S. PATENT DOCUMENTS

| | | | |
|---|---|---|---|
| 6,185,598 | B1 | 2/2001 | Farber et al. |
| 8,626,875 | B2 | 1/2014 | Viveganandhan et al. |
| 9,253,545 | B2 | 2/2016 | Lemmons |
| 2005/0044229 | A1 | 2/2005 | Brown et al. |

(Continued)

*Primary Examiner* — Chirag R Patel
(74) *Attorney, Agent, or Firm* — Toler Law Group, PC (57) ABSTRACT

Systems and methods of selecting a content source based on performance data are disclosed. A particular method includes sending, from a device, a first request for a media stream to a server. The method also includes determining, at the device, first performance data. The method further includes receiving, at the device, second performance data from the server. The method also includes selecting, based on the first performance data and the second performance data, a content source that is distinct from the server. The method further includes sending, from the device, a second request for the media stream to the content source. The method also includes receiving the media stream at the device from the content source.

20 Claims, 5 Drawing Sheets

(56) References Cited

U.S. PATENT DOCUMENTS

| | | |
|---|---|---|
| 2010/0005171 A1 | 1/2010 | Arolovitch |
| 2011/0264768 A1 | 10/2011 | Walker et al. |
| 2014/0098685 A1 | 4/2014 | Shattil |
| 2016/0337426 A1 | 11/2016 | Shribman et al. |
| 2017/0188072 A1 | 6/2017 | Major |

SELECTION OF A CONTENT SOURCE BASED ON PERFORMANCE DATA

CROSS-REFERENCE TO RELATED APPLICATIONS

The present application is a continuation of and claims priority to U.S. patent application Ser. No. 15/653,184, filed on Jul. 18, 2017, the content of which is incorporated by reference herein in its entirety.

BACKGROUND

The increasing capabilities of personal/mobile electronic devices have provided consumers with the ability to enjoy multimedia content received via the Internet. For example, live (e.g., sports events) and video on demand (VOD) content (e.g., television shows and movies) can be streamed via the Internet to personal electronic devices (e.g., computers, mobile phones, and Internet-enabled televisions).

A source device (e.g., a server) has multimedia content available for streaming or downloading to each destination device that requests the multimedia content. The multimedia content that is available via the source device may also be available for streaming or downloading via one or more additional content sources. Thus, the same multimedia content may be available via numerous content sources for streaming or downloading to a destination device.

One or more content sources other than the server may be a more suitable source at a particular time for providing the multimedia content to the destination device. For example, the server has a lower available bandwidth, a higher network load, or both, at a particular time than another content source. In this example, receiving the multimedia content from the server as compared to the other content source increases delays, packet loss, or both, at the destination device. Higher delays or increased packet loss can result in jittery playback or delayed playback, adversely impacting user experience.

SUMMARY

Systems and methods of selecting a content source based on performance data are disclosed. A destination device includes a media player configured to send a first request for a media stream to a server. For example, the destination device initiates playback of a first media stream that corresponds to a sequence of media frames. The media player is configured to send a request to the server for a next portion of the first media stream. For example, the media player may be configured to send a first particular request, receive a first set of media frames, initiate playback based on the first set of media frames, send a second particular request, receive a second set of media frames, and so on, until the media player determines that all media frames of the sequence have been received or receives user input indicating that playback of the media content item is canceled. The media player may store received media frames in a buffer prior to playback. The media player determines that playback of the media content item is done in response to determining that buffered media frames of the sequence have been played or in response to receiving user input indicating that playback of the media content item is canceled. The media player is also configured to generate first performance data indicating network conditions detected at the destination device. For example, the first performance data may indicate a network bandwidth detected at the destination device, packet loss detected at the destination device, a network protocol supported by the destination device, or a combination thereof.

The server includes a media manager configured to, in response to receiving the first request from the destination device, identify a content source that has the media stream (e.g., a next portion of the first media stream) available for transmission. The media manager is configured to determine second performance data indicating network conditions detected at the server, network conditions detected at the content source, or a combination thereof. Network conditions may include, but are not limited to, a network load, a geographic distance from the destination device, a network distance from the destination device, a supported network protocol, an available bandwidth, or a combination thereof. For example, the network load detected at the server may indicate a number of clients of the server during a particular time interval. In a particular example, the network distance of the server from the destination device includes a number of network hops along a network route between the server and the destination device. To illustrate, a data packet travels through a number of network devices (e.g., a bridge, a router, a gateway, etc.) along the network route. A network hop occurs each time that the data packet is forwarded from one device to another device along the network route.

A rules engine (at the destination device or at the server) is configured to designate the server or an alternative content source as a selected content source based on the first performance data and the second performance data. In a particular example, the first performance data indicates packet loss detected at the destination device and a first geographic location of the destination device, and the second performance data indicates a second geographic location of the server and a third geographic location of the content source. In this example, the rules engine is configured to determine a first geographic distance between the first geographic location and the second geographic location, and to determine a second geographic distance between the first geographic location and the third geographic location. In this example, the rules engine is configured to select the content source instead of the server in response to determining that the packet loss is greater than a performance threshold, that the second geographic distance is less than the first geographic distance, or both. The rules engine thus selects the content source when the content source is geographically closer to the destination device and/or the packet loss detected at the destination device is higher than a packet loss threshold.

In another example, the first performance data indicates a bandwidth detected at the destination device, and the second performance data indicates that the server has (e.g., is currently serving) a first number of clients and that the alternative content source includes a cloud service with (e.g., currently serving) a second number of clients. In this example, the rules engine is configured to select the content source (e.g., the cloud service) instead of the server in response to determining that the bandwidth detected at the destination device is less than a performance threshold, that the first number of clients is greater than an update threshold, that the second number of clients is less than a cloud service client threshold, or a combination thereof. The rules engine thus selects the cloud service when the server has a high number of clients (e.g., greater than the update threshold), the cloud service has a low number of clients (e.g., less than the cloud service client threshold), and/or the bandwidth detected at the destination device is lower than a bandwidth threshold. In some cases, the cloud service client threshold is greater than the update threshold. In these cases, the cloud service (with multiple servers) is configured to provide the same (or higher) bandwidth to more clients as the single server with fewer clients.

It should be noted that the examples described above and herein regarding packet loss, geographic distance, bandwidth, and number of clients are for illustrative purposes, and are not to be considered limiting. In alternative aspects, performance data may include more, fewer, or different data. Moreover, the rules engine may be present at a destination device or at a server, and the present disclosure may thus provide a flexible, performance distributed content source selection mechanism.

In a particular example, the rules engine is included in the destination device. In this example, the media manager is configured to send the second performance data from the server to the destination device in response to receiving the first request for the media stream from the destination device. The rules engine of the destination device is configured to designate the server or the content source as the selected content source. The media player is configured to send a second request for the media stream to the selected content source, and to receive the media stream from the selected content source.

In another example, the rules engine is included in the server. In this example, the media player is configured to send the first performance data from the destination device to the server concurrently with sending the first request from the destination device to the server. The rules engine of the server is configured to designate the server or the content source as the selected content source. The media manager is configured to send the media stream to the destination device in response to determining that the selected content source includes the server. Alternatively, the media manager is configured to, in response to determining that the selected content source is distinct from the server, send an instruction to the destination device indicating that the media stream is to be requested from the selected content source. The media player is configured to send the second request for the media stream to the selected content source in response to determining that the instruction indicates that the media stream is to be requested from the selected content source. The media player is configured to receive the media stream from the selected content source.

In an example in which the rules engine is included in the destination device, the server provides the second performance data to the destination device and the destination device designates the selected content source. In an example in which the rules engine is included in the server, the destination device provides the first performance data to the server and the server informs the destination device of the selected content source. Independently of whether the server or the destination device designates the selected content source, the destination device receives the media stream from a source (e.g., the content source or the server) that is selected by the rules engine based on the first performance data and the second performance data. The rules engine selects the content source or the server based on a comparison of network conditions detected at the server and network conditions detected at the content source. The selected content source may be a more suitable source of content as compared to the server for network conditions detected at the destination device. For example, the rules engine is configured to select a geographically closer source when the destination device is experiencing high packet loss, because the destination device may be likely to experience lower packet loss when receiving the media stream from a geographically closer source. As another example, the rules engine is configured to select a cloud service with a low number of clients when the server has a high number of clients and when low bandwidth is detected at the destination device, because the destination device is likely to receive a higher quality media stream from the cloud service with a low number of clients and more available bandwidth, as compared to from a server with a high number of clients and less available bandwidth.

DETAILED DESCRIPTION

Figure 1:
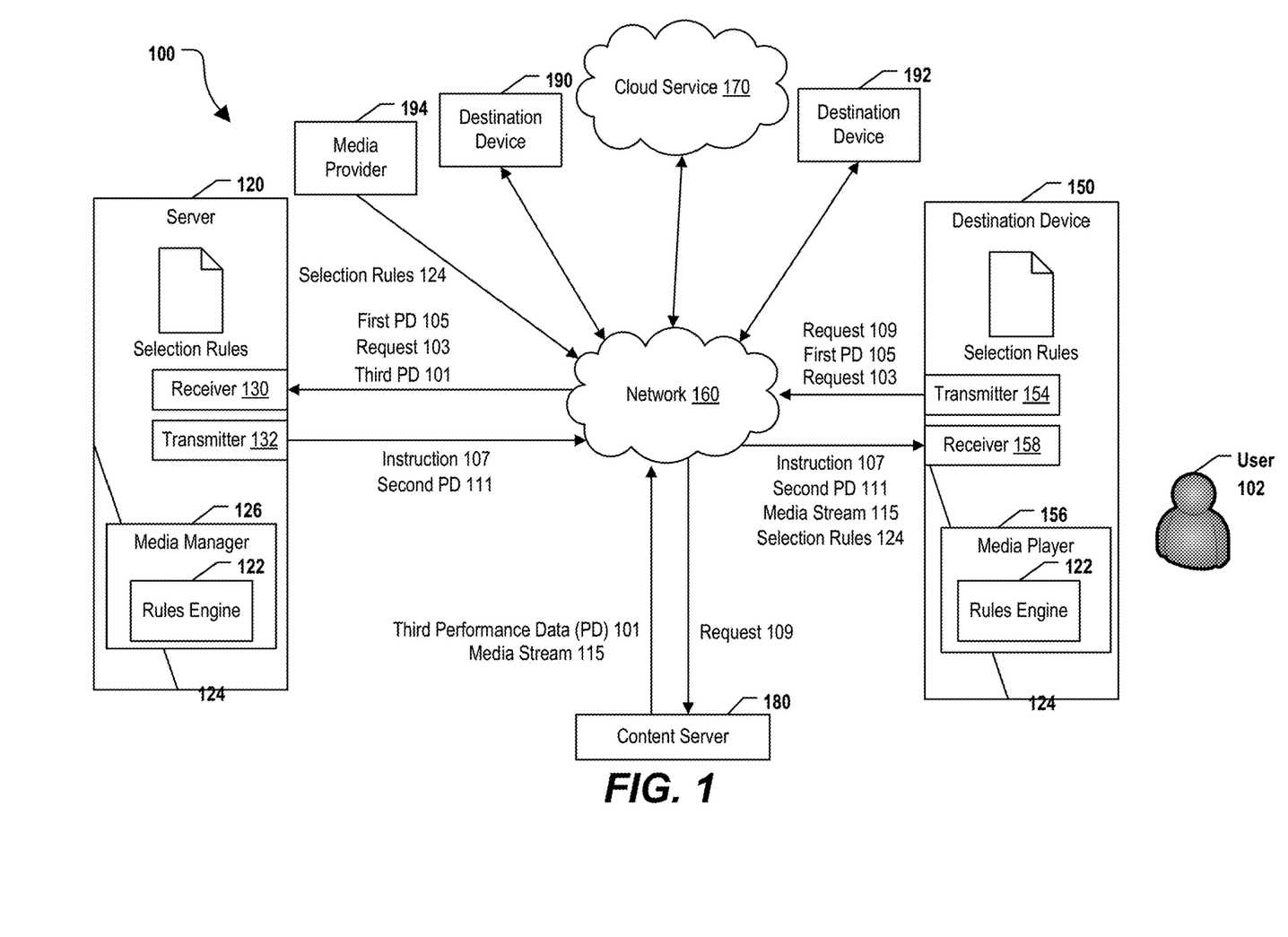
FIG. 1 is a diagram of a particular aspect of a system that is operable to select a content source based on performance data.

FIG. 1 is a diagram of a particular aspect of a system 100 that is operable to select a content source based on performance data. The system 100 includes a server 120 and a destination device 150, each of which is communicably coupled to one or more media delivery networks, such as a local area network (LAN), a wide area network (WAN), a public access network, a private access network, a content distribution network (CDN), an internet service provider (ISP) network, the internet, an internet hosting service, a cloud service provider network, and/or a wireless service (e.g., third generation wireless telephone technology (3G) or fourth generation wireless telephone technology (4G)) provider network. For example, the destination device 150 is communicatively coupled, via a network 160, to the server 120. To illustrate, the destination device 150 includes a transmitter 154 and a receiver 158, and the server 120 includes a receiver 130 and a transmitter 132. The transmitter 154 is configured to communicate, via the network 160, with the receiver 130. The transmitter 132 is configured to communicate, via the network 160, with the receiver 158. The destination device 150 may also be communicatively coupled to (or at least have access to) one or more additional content sources, such as a content server 180, a cloud service 170, a second destination device 190, a third destination device 192, another type of content source, or a combination thereof. It should be understood that the content server 180, the cloud service 170, the second destination device 190, and the third destination device 192 are provided as illustrative examples, and are not meant to be limiting. In other aspects, the system 100 may include fewer content sources, more content sources, different content sources, or a combination thereof. In a particular example, the system 100 may include a multicast server that is configured to provide media content. In a particular example, the system 100 may include a device that supports web real-time communication (webRTC). The server 120 is communicatively coupled to a media provider 194 (e.g., a device associated with the media provider 194). In a particular aspect, the media provider 194 is configured to provide a media stream 115 to the server 120.

The content server 180 is configured to provide media content. In a particular aspect, the cloud service 170 is provided by or associated with a CDN network. The CDN network includes one or more servers, devices, or a combination thereof, configured to provide media content. The destination device 150 may include a media player 156 configured to receive media content and to provide media playback. The destination device 150 includes a mobile telephone, a computing device (e.g., a laptop computer, a desktop computer, or a tablet computer), a television, a set-top box, a game console, a portable media player, or another device capable of media playback. In a particular aspect, the destination device 150, the second destination device 190, the third destination device 192, one or more additional devices, or a combination thereof, are included in a peer-to-peer network. In this aspect, the second destination device 190, the third destination device 192, or both, may be configured to provide media content (or portions thereof) to the destination device 150.

In a particular aspect, the server 120 includes a media manager 126 configured to send and receive data, such as a media stream 115. For example, the server 120 may be supporting media server functions, as further described with reference to FIG. 5. The media stream 115 may include audio content, video content, graphics content, text content, or any combination thereof. For example, the media stream 115 may include a live stream or a video-on-demand (VOD) stream. In a particular aspect, the server 120 receives the media stream 115 from another network device, such as a live stream capture device, or from a storage device connected to the server 120. In a particular example, a first media stream is divided into multiple "chunks," "portions," "segments," or "pieces" that are individually routable. Thus, the first media stream may correspond to one or more distinct data packets, and the media stream 115 may correspond to at least one of the distinct data packets.

In a particular implementation, the server 120 includes a rules engine 122 and one or more selection rules 124. Alternatively, or in addition, the destination device 150 includes the rules engine 122 and the selection rules 124. In a particular aspect, the server 120 is configured to receive the selection rules 124, via the receiver 130, from the media provider 194 or a device associated with the media provider 194. In a particular aspect, the destination device 150 is configured to receive the selection rules 124, via the receiver 158, from the media provider 194, the server 120, or both. In a particular aspect, the rules engine 122 is configured to generate or update the selection rules 124 based on user input from a user (e.g., a media provider employee or a user 102 of the destination device 150). The rules engine 122 corresponds to hardware and/or software that is configured to evaluate the selection rules 124 and to determine which available content source to select for requesting the media stream 115, as described herein. The selection rules 124 indicate values of performance data that trigger selection of a particular content source. In a particular aspect, the selection rules 124 are stored in a database and/or a file (e.g., an extensible markup language (XML) file). An example of the selection rules 124 is further described with reference to FIG. 2.

During operation, the media player 156 of the destination device 150 sends a request 103 (e.g., a first request) for the media stream 115 to the server 120. For example, a user 102 selects an icon displayed by the media player 156 to initiate playback of a first media stream. The media player 156 transmits the request 103, via the transmitter 154 and the network 160, to the receiver 130. The media stream 115 corresponds to a particular portion of a first media stream. The request 103 specifies the particular portion (e.g., portion "X") of the first media stream. The particular portion is specified using start/end frame numbers, start/end times, a portion number/identifier, etc. The requested portion may correspond to a "chunk" and/or a group of pictures (GOP). A "chunk" refers to a fixed (e.g., ten seconds) or variable length duration of a stream rendition. A group of pictures refers to a collection of video frames that includes one or more intra-coded frames (I-frames) and one or more additional frames that include difference information relative to the one or more I-frames (e.g., predicted frame (P-frame) and/or bi-directional predicted frame (B-frame)).

The media player 156, at a particular point in time, determines one or more network conditions detected at the destination device 150 using various network analysis techniques. The network conditions detected at the destination device 150 correspond to first network conditions detected at the transmitter 154, second network conditions detected at the receiver 158, or a combination thereof. The network conditions may include a type of network, a network protocol, a network bandwidth, packet loss, or a combination thereof. For example, the media player 156 is configured to determine that the destination device 150 is included in a particular type of network.

The media player 156 is configured to determine that the destination device 150 is configured to support a particular network protocol. The particular network protocol includes a network protocol specified by a standards organization, such as Institute of Electrical and Electronics Engineers (IEEE® (a registered trademark of the Institute of Electrical and Electronics Engineers, New York)), International Telecommunication Union (ITU® (a registered trademark of the International Telecommunication Union)), or Global System for Mobile communication (GSM® (a registered trademark of the GSM MOU Association, Switzerland)). For example, the particular network protocol includes IEEE® 802.11x, second generation wireless telephone technology (2G), 3G, 4G, or fifth generation wireless telephone technology (5G).

In a particular example, the media player 156 is configured to determine that the destination device 150 is configured to support a wireless fidelity (Wi-Fi® (a registered trademark of the Wi-Fi Alliance, California)) network corresponding to an IEEE® 802.11x protocol in response to determining that the destination device 150 includes a Wi-Fi® interface, that the destination device 150 is within a coverage range of a Wi-Fi® access point, that the destination device 150 is authorized to communicate via the Wi-Fi® access point, or a combination thereof.

The media player 156 is configured to determine a network bandwidth based on an amount of data received by the receiver 158 during a particular time interval (e.g., network bandwidth=bytes of data received/particular time interval). The particular time interval is based on a configuration setting, a default value, a user input, or a combination thereof. In a particular aspect, the media player 156 is configured to determine the network bandwidth based on a supported network protocol. For example, the media player 156 is configured to determine that the destination device 150 is configured to support a particular network bandwidth in response to determining that the destination device 150 is configured to support a particular network protocol and that the particular network protocol is associated with the particular network bandwidth.

The media player 156 is configured to determine packet loss experienced by the destination device 150 during a particular time interval. For example, the media player 156 determines the packet loss detected by an application protocol (e.g., a transmission control protocol (TCP)) of the destination device 150 during the particular time interval. To illustrate, the media player 156 determines the packet loss based on a first number of retransmission requests received by the TCP protocol, a second number of retransmission sent by the TCP protocol, or both, during the particular time interval (e.g., packet loss=first number+second number). The media player 156 is configured to generate first performance data (PD) 105 indicating the network conditions detected at the destination device 150. In some examples, the media player 156 and one or more of the content sources shown in FIG. 1 may communicate using a WOWZ protocol. The WOWZ protocol may be a TCP-based messaging protocol used for inter-device communication.

The media manager 126, at a particular point in time, determines one or more network conditions detected at the server 120 using various network analysis techniques. The network conditions are associated with the transmitter 132, the receiver 130, or both. The network conditions may include a network protocol, a network load, a geographic distance from the destination device 150, a network distance from the destination device 150, or a combination thereof. For example, the media manager 126 is configured to determine that the server 120 is configured to support a particular network protocol. The media manager 126 is configured to determine that the server 120 has a particular network load corresponding to a number of concurrent clients connected to the server 120 during a particular time interval.

The media manager 126 is configured to determine that the server 120 has a particular geographic location based on a configuration setting, a user input, a default value, or a combination thereof. In a particular aspect, the media manager 126 receives data from the destination device 150 indicating a first geographic location of the destination device 150. The media manager 126 determines a first geographic distance between the server 120 and the destination device 150 based on a difference between the particular geographic location of the server 120 and the first geographic location of the destination device 150. The media manager 126 is configured to determine that the server 120 has a particular network distance from the destination device 150. For example, the media manager 126 is configured to use a traceroute command to determine a number of network hops corresponding to a network distance from the server 120 to the destination device 150. The media manager 126 is configured to generate second PD 111 indicating the network conditions detected at the server 120. For example, the network conditions detected at the server 120 correspond to first network conditions detected at the receiver 130, second network conditions detected at the transmitter 132, or a combination thereof. In a particular aspect, the media manager 126 generates the second PD 111 in response to receiving the request 103 from the destination device 150 and determining that the media stream 115 is available for transmission. The media manager 126 is configured to determine that the media stream 115 is available for transmission in response to determining that data corresponding to the media stream 115 is stored in a memory (e.g., a storage device) accessible by the server 120. In this aspect, the second PD 111 indicates that the media stream 115 is available for transmission from the server 120 to the destination device 150.

The server 120 is configured to receive, via the receiver 130, performance data from other content sources indicating network conditions detected at the other content sources, such as the content server 180, the second destination device 190, the third destination device 192, the cloud service 170, or a combination thereof. For example, the server 120 is configured to receive third PD 101 from the content server 180. In a particular aspect, the media manager 126 is configured to send a PD request to the content server 180 in response to receiving the request 103 from the destination device 150. The PD request indicates the media stream 115, the destination device 150, or both. The content server 180 is configured to send the third PD 101 to the server 120 in response to receiving the PD request from the server 120 and determining that the media stream 115 is available for transmission at the content server 180. The third PD 101 indicates network conditions detected at the content server 180. The network conditions may include a network protocol, a network load, a geographic distance from the destination device 150, a network distance from the destination device 150, or a combination thereof. The third PD 101 may also indicate that the media stream 115 is available for transmission from the content server 180 to the destination device 150. The media manager 126 is configured to update the second PD 111 to include the third PD 101.

In a particular example, the server 120 receives performance data from a device (e.g., a server) of the cloud service 170. In a particular aspect, the media manager 126 is configured to send a PD request to the cloud service 170 in response to receiving the request 103 from the destination device 150. The cloud service 170 is configured to send the performance data to the server 120 in response to receiving the PD request from the server 120. The performance data indicates network conditions detected at the device, the cloud service 170, or both. In a particular aspect, the performance data indicates that the media stream 115 is available for transmission from the cloud service 170 to the destination device 150. The media manager 126 updates the second PD 111 to include the performance data corresponding to the cloud service 170.

In a particular example, the server 120 receives performance data from the second destination device 190, the third destination device 192, or both. For example, the server 120 receives first performance data from the second destination device 190, receives second performance data from the third destination device 192, or both. In a particular aspect, the media manager 126 is configured to send a PD request to the second destination device 190, the third destination device 192, or both, in response to receiving the request 103 from the destination device 150. The second destination device 190 is configured to send the first performance data to the server 120 in response to receiving the PD request from the server 120 and determining that the media stream 115 is available for transmission from the second destination device 190 to the destination device 150. Similarly, the third destination device 192 is configured to send the second performance data to the server 120 in response to receiving the PD request from the server 120 and determining that the media stream 115 is available for transmission from the third destination device 192. In a particular example, each of the second destination device 190 and the destination device 150 is streaming the same media stream. The media stream 115 corresponds to a first chunk of the first media stream. The second destination device 190 is "ahead" of the destination device 150 and has previously received the first chunk from the server 120. Thus, the second destination device 190 has the first chunk available for transmission, via a peer-to-peer network, to the destination device 150. The first performance data indicates that the second destination device 190 is included in a peer-to-peer network. The media manager 126 is configured to update the second PD 111 to include the first performance data corresponding to the second destination device 190, the second performance data corresponding to the third destination device 192, or a combination thereof.

The rules engine 122 is configured to identify one or more content sources that have the media stream 115 available for transmission. For example, the rules engine 122 is configured to identify a content source (e.g., the server 120, the content server 180, the second destination device 190, the third destination device 192, or the cloud service 170) of the media stream 115 in response to determining that the second PD 111 indicates that the media stream 115 is available for transmission from the content source to the destination device 150. In a particular aspect, the server 120 corresponds to an origin of the media stream 115. Selection of a content source other than the server 120 (e.g., the content server 180, the second destination device 190, the third destination device 192, or the cloud service 170) may enable origin offload. For example, the destination device 150 may request the media stream 115 from the selected content source, i.e., a content source other than the origin (e.g., the server 120) of the media stream 115.

The rules engine 122 is configured to compare the selection rules 124 with the first PD 105 and the second PD 111 to determine whether selection of at least one of the available content sources is triggered, as further described with reference to FIG. 2. For example, the rules engine 122 designates one of the available content sources (e.g., the server 120, the content server 180, the second destination device 190, the third destination device 192, or the cloud service 170) as a selected content source based on the selection rules 124, the first PD 105, and the second PD 111, as further described with reference to FIG. 2. In a particular illustrative example, the first PD 105 indicates packet loss detected at the destination device 150 and a first geographic location of the destination device 150, and the second PD 111 indicates a second geographic location of the server 120 and a third geographic location of the content server 180. In this example, the rules engine 122 is configured to determine a first geographic distance between the first geographic location and the second geographic location, and to determine a second geographic distance between the first geographic location and the third geographic location. In this example, the rules engine 122 may be configured to select the content server 180 instead of the server 120 in response to determining that the packet loss is greater than a performance threshold, that the second geographic distance is less than the first geographic distance, or both. The rules engine 122 thus selects the content server 180 when the content server 180 is geographically closer to the destination device 150 and/or the packet loss detected at the destination device 150 is greater than a packet loss threshold.

In a particular example, the first PD 105 indicates a bandwidth detected at the destination device 150, and the second PD 111 indicates that the server 120 has a first number of clients and that the cloud service 170 has a second number of clients. In this example, the rules engine 122 may be configured to select the cloud service 170 instead of the server 120 in response to determining that the bandwidth detected at the destination device 150 is less than a performance threshold, that the first number of clients is greater than an update threshold, that the second number of clients is less than a cloud service client threshold, or a combination thereof. The rules engine 122 thus selects the cloud service 170 when the server 120 has a high number of clients (e.g., greater than the update threshold), the cloud service 170 has a low number of clients (e.g., lower than the cloud service client threshold), and/or the bandwidth detected at the destination device 150 is lower than a bandwidth threshold. In some cases, the cloud service client threshold is greater than the update threshold. In these cases, the cloud service 170 (with multiple servers) is configured to provide the same (or higher) bandwidth to more clients as the single server 120 with fewer clients.

The rules engine 122 may reevaluate the selection rules 124 periodically, on a chunk-by-chunk basis, in response to an event, in response to user input, in response to updated performance data associated with the destination device 150, the server 120, the content server 180, the second destination device 190, and/or the third destination device 192, or any combination thereof. Thus, the rules engine 122 may select a first content source for requesting a first portion of the first media stream and select a second content source for requesting a second portion of the first media stream. Dynamically switching sourcing of the first media stream from the first content source to the second content source may be performed without interrupting playback of the first media stream at the destination device 150. To illustrate, the media player 156 is configured to access a local buffer to play (e.g., render) the first media stream. Each portion of the first media stream (e.g., the media stream 115) may include an indication of its place within the first media stream (e.g., a packet number, a chunk identifier (ID), etc.). Switching routing from the first content source to the second content source may be performed without interrupting playback of the first media stream at the destination device 150 by providing (e.g., via quality of service (QoS) mechanisms) the second portion to the local buffer before playback of the first portion is completed.

In the example where the rules engine 122 is included in the server 120, the rules engine 122 designates the selected content source in response to receiving the request 103 from the destination device 150. The media manager 126 sends the media stream 115 to the destination device 150 in response to determining that the selected content source is the server 120. Alternatively, the media manager 126 sends an instruction 107 to the destination device 150 in response to determining that the selected content source is not the server 120 (e.g., the selected content source is the content server 180, the second destination device 190, the third destination device 192, or the cloud service 170). The instruction 107 indicates that the destination device 150 is to request the media stream 115 from the selected content source (e.g., the content server 180, the second destination device 190, the third destination device 192, or the cloud service 170). In a particular illustrative example, the instruction 107 may indicate that the destination device 150 is to use a peer-to-peer service to request the media stream 115. In this example, the instruction 107 may indicate a peer-to-peer centralized server address or may identify the second destination device 190 or the third destination device 192. The media manager 126 sends the instruction 107, via the transmitter 132 and the network 160, to the destination device 150. The media player 156 sends a request 109 (e.g., the second request) to the selected content source (e.g., the content server 180, the second destination device 190, the third destination device 192, or the cloud service 170) in response to receiving the instruction 107 and determining that the instruction 107 indicates that the media stream 115 is to be requested from the selected content source, i.e., a content source other than the server 120. The selected content source (e.g., the content server 180, the second destination device 190, the third destination device 192, or the cloud service 170) is configured to send the media stream 115 to the destination device 150 in response to receiving the request 109 from the destination device 150.

The media player 156 may be instructed to request the media stream 115 from an alternate content source in various ways. As an example, the server 120 may send the destination device 150 a redirect message, such as an HTTP redirect message, that identifies the alternate content source. Alternatively, if the server 120 is overloaded and/or is unable to respond, the media player 156 may detect a timeout of the first request 105 and may proceed to a next available source in a playlist whose selection triggered the first request 105. As yet another example, in scenarios where the rules engine 122 is on the server-side (e.g., at the server 120), the server 120 may instruct the media player 156 to use an alternate content source using a data channel of a streaming protocol that is in use or using a side-channel.

In the example where the rules engine 122 is included in the destination device 150, the rules engine 122 designates the selected content source (e.g., the server 120, the content server 180, the second destination device 190, the third destination device 192, or the cloud service 170) in response to receiving the second PD 111 from the server 120. The media player 156 sends the request 109 to the content source (e.g., the server 120, the content server 180, the second destination device 190, the third destination device 192, or the cloud service 170) in response to determining that the rules engine 122 has designated the selected content source. The selected content source (e.g., the content server 180, the second destination device 190, the third destination device 192, or the cloud service 170) is configured to send the media stream 115 to the destination device 150 in response to receiving the request 109 from the destination device 150.

The system 100 thus enables the destination device 150 to receive the media stream 115 from a dynamically selected content source that is selected by the rules engine 122 based on the first PD 105 and the second PD 111, independently of whether the rules engine 122 is included in the server 120 or the destination device 150. The selected content source designated by the rules engine 122 may be a more suitable source (as compared to other content sources) at a particular time for provision of the media stream 115 to the destination device 152. For example, the rules engine 122 may select a geographically closer source (e.g., the content server 180) when the destination device 150 is experiencing high packet loss. The destination device 150 may experience lower packet loss when receiving the media stream 115 from a geographically closer source (e.g., the content server 180). As another example, the rules engine 122 may select the cloud service 170 when the server 120 has a high number of clients and/or when low bandwidth is detected at the destination device 150. The destination device 150 may receive a higher quality of the media stream 115 from the cloud service 170 with more available bandwidth, as compared to from the server 120 with a high number of clients and lower available bandwidth.

Figure 2:
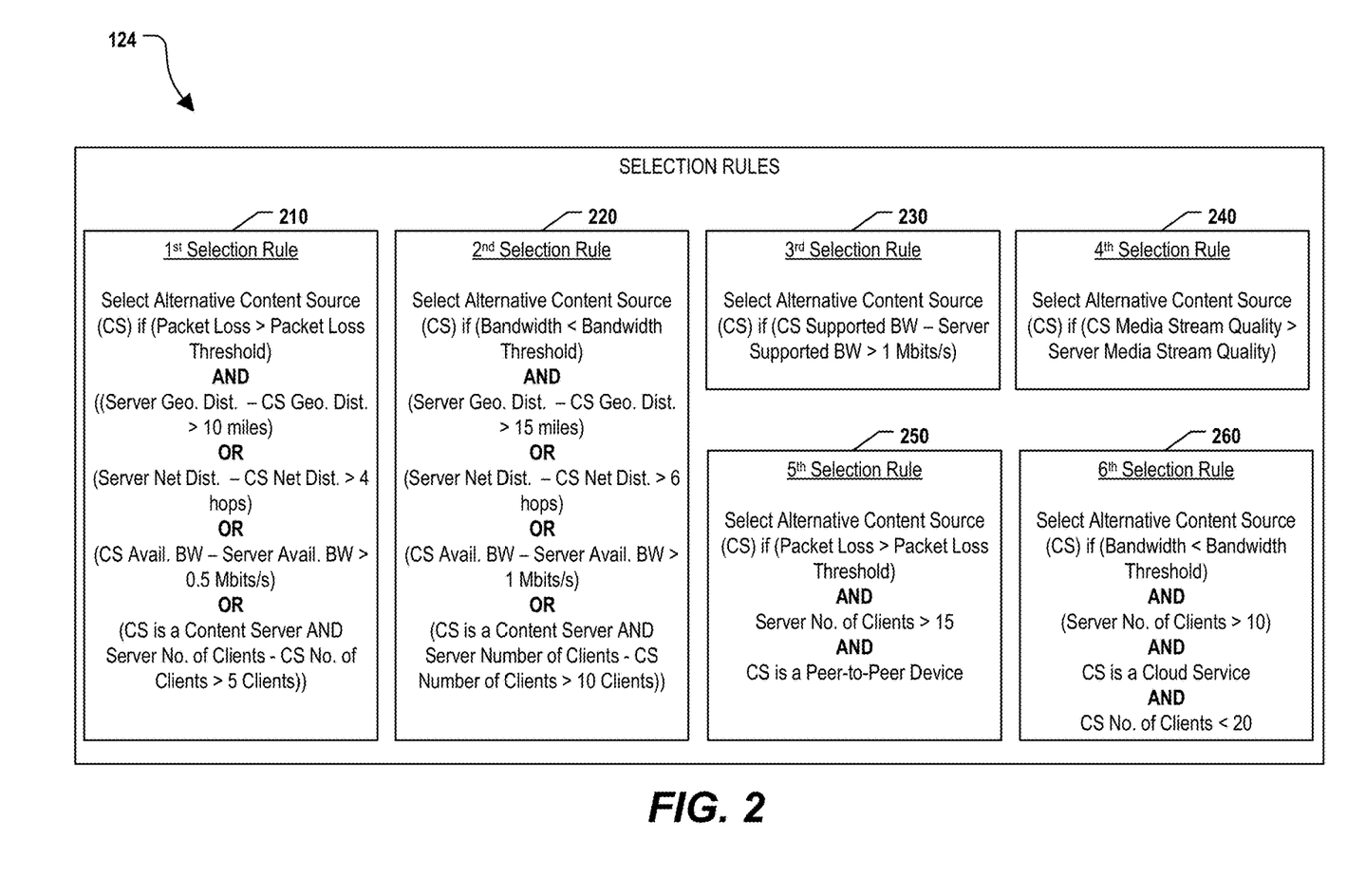
FIG. 2 is a diagram of examples of selections rules used by the system of FIG. 1 to select a content source.

FIG. 2 is a diagram illustrating an example of the selection rules 124. The rules engine 122 of FIG. 1 is configured to select a content source based on the selection rules 124. The selection rules 124 include a first selection rule 210, a second selection rule 220, a third selection rule 230, a fourth selection rule 240, a fifth selection rule 250, and a sixth selection rule 260. It should be understood that the selections rules 210-260 are provided as examples and are not to be considered limiting. In some aspects, the selection rules 124 include one or more of the selections rules 210-260, one or more other selection rules, or a combination thereof.

In a particular aspect, the rules engine 122 is configured to determine that at least one selection rule of the selection rules 124 triggers selection of an alternative content source (e.g., the content server 180, the cloud service 170, the second destination device 190, or the third destination device 192 of FIG. 1) in response to determining that a first value of a first performance metric of the destination device 150 fails to satisfy a performance threshold and that a difference between a second value of a second performance metric associated with the server 120 and a third value of the second performance metric associated with a content source satisfies an update threshold, as described herein. In an alternative aspect, the rules engine 122 is configured to determine that at least one selection rule of the selection rules 124 triggers selection of an alternative content source (e.g., the content server 180, the cloud service 170, the second destination device 190, or the third destination device 192 of FIG. 1) in response to determining that a first value of a first performance metric of the destination device 150 fails to satisfy a performance threshold, that a second value of a second performance metric associated with the server 120 satisfies an update threshold, and that the content source is includes a particular type of device (e.g., a content server) or is included in a particular type of network (e.g., a cloud service or a peer-to-peer network), as described herein.

The first PD 105 indicates the first value of the first performance metric of the destination device 150. For example, the first value of the first performance metric may indicate packet loss detected at the destination device 150, a bandwidth detected at the destination device 150, a network protocol supported by the destination device 150, a media stream quality supported by the destination device 150, or a combination thereof.

The second PD 111 indicates the second value of the second performance metric associated with the server 120 and the third value of the second performance metric associated with the content source (e.g., the content server 180, the cloud service 170, the second destination device 190, or the third destination device 192 of FIG. 1). For example, the second PD 111 may indicate a server geographic distance and a content source geographic distance, a server network distance and a content source network distance, a server available bandwidth and a content source available bandwidth, a server number of clients and a content source number of clients, a server supported bandwidth and a content source supported bandwidth, a server media stream quality and a content source media stream quality, or a combination thereof.

The performance threshold may correspond to a packet loss threshold or a bandwidth threshold. The update threshold may correspond to a geographic distance threshold, a network distance threshold, an available bandwidth threshold, a number of clients threshold, a supported bandwidth threshold, or a media stream quality threshold.

The rules engine 122 is configured to determine that the first selection rule 210 triggers a selection of a content source other than the server 120 (e.g., the content server 180, the cloud service 170, the second destination device 190, or the third destination device 192 of FIG. 1) in response to determining that packet loss detected at the destination device 150 is greater than a packet loss threshold, and at least one of a first set of conditions associated with the server 120 and the alternative content source is satisfied. For example, at least one of the first set of conditions is satisfied when a difference between the server geographic distance and the content source geographic distance is greater than a geographic distance threshold (e.g., server geographic distance−content source geographic distance>10 miles), a difference between the server network distance and the content source network distance is greater than a network distance threshold (e.g., server network distance−content source network distance>4 network hops), a difference between the server available bandwidth and the content source available bandwidth is greater than an available bandwidth threshold (e.g., content source available bandwidth−server available bandwidth>0.5 megabits per second (Mbits/s)), or the content source is a content server, such as the content server 180 (rather than a cloud service or a peer-to-peer device) and a difference between the server number of clients and the content source number of clients is greater than a number of clients threshold (e.g., server number of clients−content source number of clients>5 clients).

The rules engine 122 is configured to determine that the second selection rule 220 triggers a selection of an alternative content source in response to determining that a bandwidth detected at the destination device 150 is less than a bandwidth threshold, and that at least one of a second set of conditions associated with the server 120 and the content source is satisfied. For example, at least one of the second set of conditions is satisfied when a difference between the server geographic distance and the content source geographic distance is greater than a geographic distance threshold (e.g., server geographic distance−content source geographic distance>15 miles), a difference between the server network distance and the content source network distance is greater than a network distance threshold (e.g., server network distance−content source network distance>6 network hops), a difference between the server available bandwidth and the content source available bandwidth is greater than an available bandwidth threshold (e.g., content source available bandwidth−server available bandwidth>1 Mbits/s), or the content source is a content server, such as the content server 180, and that a difference between the server number of clients and the content source number of clients is greater than a number of clients threshold (e.g., server number of clients−content source number of clients>10 clients).

The rules engine 122 is configured to determine that the third selection rule 230 triggers a selection of an alternative content source in response to determining that a difference between a server supported bandwidth and a content server supported bandwidth is greater than a supported bandwidth threshold (e.g., content server supported bandwidth−server supported bandwidth>1 Mbits/s). In a particular illustrative example, the destination device 150 supports a first set of network protocols, the server 120 supports a second set of network protocols, and the content source supports a third set of network protocols. In this example, the server supported bandwidth may correspond to a bandwidth supported by a first common network protocol of the first set of network protocols and the second set of network protocols. To illustrate, the server supported bandwidth may correspond to a network protocol that is supported by each of the server 120 and the destination device 150. The content source supported bandwidth may correspond to a bandwidth supported by a second common network protocol of the first set of network protocols and the third set of network protocols. For example, the content source supported bandwidth may correspond to a network protocol that is supported by each of the destination device 150 and the content source.

The rules engine 122 is configured to determine that the fourth selection rule 240 triggers a selection of an alternative content source in response to determining that a content server media stream quality is greater than a server media stream quality (e.g., content server media stream quality>server media stream quality). In a particular illustrative example, the destination device 150 supports a first set of media stream qualities (e.g., ultra-high definition (UHD) quality, high-definition (HD) quality, standard definition (SD) quality, etc.), the server 120 has the media stream 115 available for transmission in a second set of media stream qualities (e.g., only standard definition (SD) quality), and the content source has the media stream 115 available for transmission in a third set of media stream quality (e.g., only high-definition (HD) quality). In this example, the content server media stream quality may correspond to a first common media stream quality of the first set of media stream quality and the second set of media stream quality. To illustrate, the content server media stream quality may correspond to a media stream quality that is supported by each of the server 120 and the destination device 150. The server media stream quality may correspond to a second common media stream quality of the first set of media stream quality and the third set of media stream quality. For example, the server media stream quality may correspond to a media stream quality that is supported by each of the content source and the destination device 150.

The rules engine 122 is configured to determine that the fifth selection rule 250 triggers a selection of an alternative content source in response to determining that the packet loss detected at the destination device 150 is greater than a packet loss threshold, that the server number of clients is greater than a server number of clients threshold, and that the content source corresponds to a peer-to-peer device. The rules engine 122 is configured to determine that the sixth selection rule 260 triggers a selection of an alternative content source other than the server 120 (e.g., the cloud service 170 of FIG. 1) in response to determining that the bandwidth detected at the destination device 150 is less than a bandwidth threshold, that the server number of clients is greater than a server number of clients threshold (e.g., 10), that the content source corresponds to a cloud service, such as the cloud service 170, and that the content source number of clients is less than a content source number of clients threshold (e.g., 20).

The selection rules 210-260 are provided as illustrative examples. The selection rules 124 may include fewer, more, or different selection rules related to network conditions of various content sources. For example, the system 100 of FIG. 1 may include a multicast server that is configured to provide media content. In this example, the rules engine 122 may determine that a particular selection rule of the selection rules 124 triggers selection of a content source other than the server 120 (e.g., the multicast server) in response to determining that the content source is a multicast server, and that a difference between the content source network distance and the server network distance is less than a threshold (e.g., 5 network hops).

In a particular example, the rules engine 122 may determine that a particular selection rule of the selection rules 124 triggers selection of a content source other than the server 120 based at least in part on determining that the content source supports a particular communication protocol that is supported by the destination device 150. To illustrate, the rules engine 122 may select the second destination device 190 based at least in part on determining that each of the destination device 150 and the second destination device 190 supports web real-time communication (webRTC).

In a particular example, the rules engine 122 may determine that a particular selection rule of the selection rules 124 triggers selection of a content source other than the server 120 (e.g., the second destination device 190 or the third destination device 192) in response to determining that two-way communication is requested at the destination device 150, and that the content source supports two-way communication (e.g., is a peer-to-peer device). The rules engine 122 may determine that two-way communication is requested at the destination device 150 based on user input, configuration setting, a default value, an application setting, or a combination thereof.

In another example, the rules engine 122 may trigger a request to an alternate content source in response to a currently used server becoming unavailable (e.g., if the currently used server does not respond to requests within a threshold timeout period). As another example, if two available content sources have similar bandwidth and geographic location, the rules engine 122 may select the content source having a lower cost (e.g., cost of content delivery to media players).

As yet another example, a user of a media player may implement a rule in the rules engine 122 specifying that if various factors (e.g., bandwidth, number of concurrent users, etc.) are within threshold tolerances, then the content source having a lowest cost to the user should be selected. Moreover, the user may indicate that they are willing to tolerate a certain amount of packet loss, geographic distance, number of network hops, etc. in order to have a lower cost of viewing a media stream.

In a further example, the rules engine 122 may implement a rule specifying that a lowest-cost content source is to be chosen if the number of connected clients at an initially selected content source exceeds a threshold. Such a rule may provide cost savings and reduce network/server load.

In some examples, the rules engine 122 may trigger use of an alternate content source based on audio and/or video quality measurements made at a media player, an initial content source, or the alternate content source. Examples of such quality measurements may include, but are not limited to, frame drops and peak signal-to-noise ratio (PSNR). To illustrate, a media player may determine to use an alternate content source if the PSNR of audio/video received from an initial content source fails to satisfy a signal quality threshold. As another illustration, a server providing a media stream to a media player may receive periodic quality reports from the media player, where such reports include frame drop information. The server may determine that the media stream should instead be provided by an alternate content source if the quality reports from the media player indicate that the media player has experienced more than a threshold number of total frame drops or greater than a threshold rate of frame drops.

Figure 3:
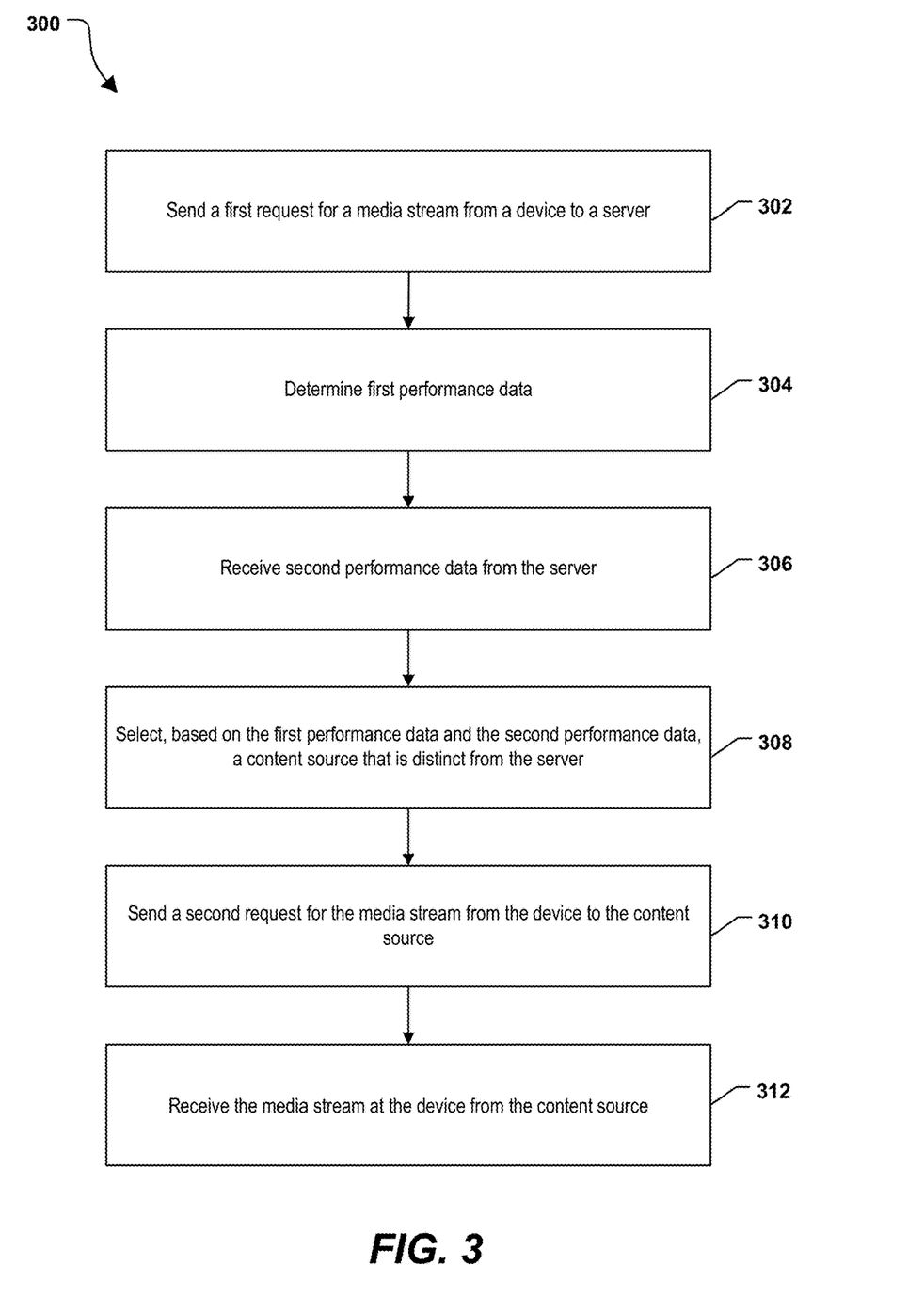
FIG. 3 is a diagram of an illustrative aspect of a method of selecting a content source based on performance data.

Referring to FIG. 3, a method of selecting a content source based on performance data is shown and generally designated 300. The method 300 may be performed by the media player 156, the rules engine 122, the transmitter 154, the receiver 158, the destination device 150, the system 100 of FIG. 1, or a combination thereof.

The method 300 includes sending a first request for a media stream from a device to a server, at 302. For example, the transmitter 154 of FIG. 1 sends the request 103 from the destination device 150 to the server 120, as described with reference to FIG. 1. The request 103 may specify the media stream 115.

The method 300 also includes determining first performance data, at 304. For example, the media player 156 of FIG. 1 determines the first PD 105, as described with reference to FIG. 1.

The method 300 further includes receiving second performance data from the server, at 306. For example, the receiver 158 of FIG. 1 receives the second PD 111 from the server 120, as described with reference to FIG. 1.

The method 300 also includes selecting, based on the first performance data and the second performance data, a content source that is distinct from the server, at 308. For example, the rules engine 122 of FIG. 1 selects, based on the first PD 105 and the second PD 111, an alternative content source (e.g., the content server 180, the second destination device 190, the third destination device 192, or the cloud service 170) that is distinct from the server 120, as described with reference to FIGS. 1-2.

The method 300 further includes sending a second request for the media stream from the device to the content source, at 310. For example, the transmitter 154 of FIG. 1 sends the request 109 for the media stream 115 from the destination device 150 to the alternative content source (e.g., the content server 180, the second destination device 190, the third destination device 192, or the cloud service 170).

The method 300 also includes receiving the media stream at the device from the content source, at 312. For example, the receiver 158 of FIG. 1 receives the media stream 115 at the destination device 150 from the alternative content source (e.g., the content server 180, the second destination device 190, the third destination device 192, or the cloud service 170). The method 300 thus enables the rules engine 122 to dynamically source, based on the first PD 105 and the second PD 111, the media stream 115 from an alternative content source that is suitable for transmission of the media stream 115.

Figure 4:
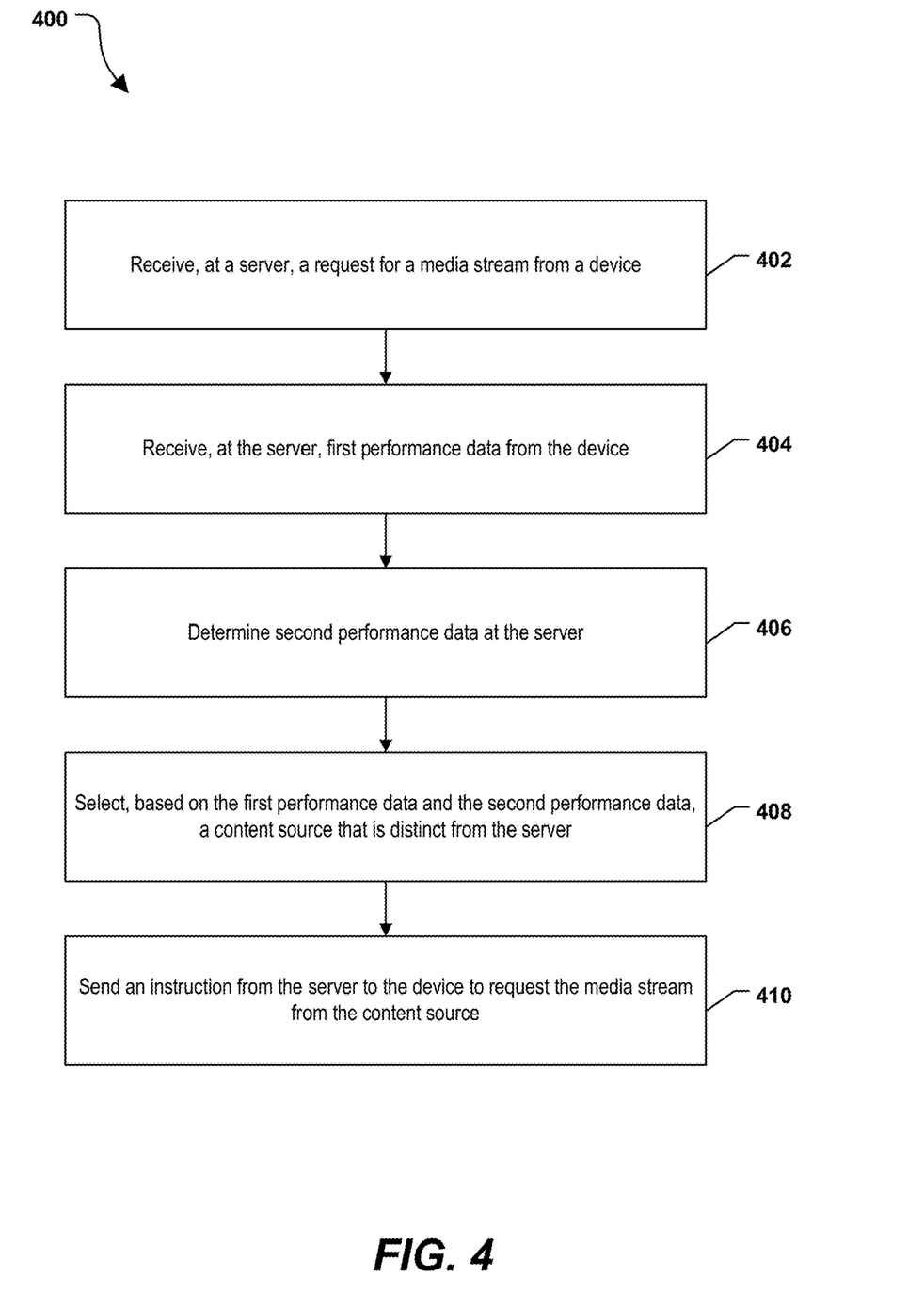
FIG. 4 is a diagram of another illustrative aspect of a method of selecting a content source based on performance data.

Referring to FIG. 4, a method of selecting a content source based on performance data is shown and generally designated 400. The method 400 may be performed by the receiver 130, the media manager 126, the rules engine 122, the server 120, the system 100 of FIG. 1, or a combination thereof.

The method 400 includes receiving, at a server, a request for a media stream from a device, at 402. For example, the receiver 130 of FIG. 1 receives the request 103 for the media stream 115 from the destination device 150.

The method 400 also includes receiving, at the server, first performance data from the device, at 404. For example, the receiver 130 of FIG. 1 receives the first PD 105 from the destination device 150.

The method 400 further includes determining second performance data at the server, at 406. For example, the media manager 126 determines the second PD 111 at the server 120, as described with reference to FIG. 1.

The method 400 also includes selecting, based on the first performance data and the second performance data, a content source that is distinct from the server, at 408. For example, the rules engine 122 of FIG. 1 selects, based on the first PD 105 and the second PD 111, an alternative content source (e.g., the content server 180, the second destination device 190, the third destination device 192, or the cloud service 170) that is distinct from the server 120, as further described with reference to FIGS. 1-2.

The method 400 further includes sending an instruction from the server to the device to request the media stream from the content source, at 410. For example, the transmitter 132 of FIG. 1 sends the instruction 107 from the server 120 to the destination device 150 to request the media stream 115 from the alternative content source (e.g., the content server 180, the second destination device 190, the third destination device 192, or the cloud service 170).

One or more method steps described with reference to FIGS. 3-4 may be reordered, combined, split, or performed at least partially concurrently. For example, the step 304 of the method 300 could be performed prior to the step 306 of the method 300.

Figure 5:
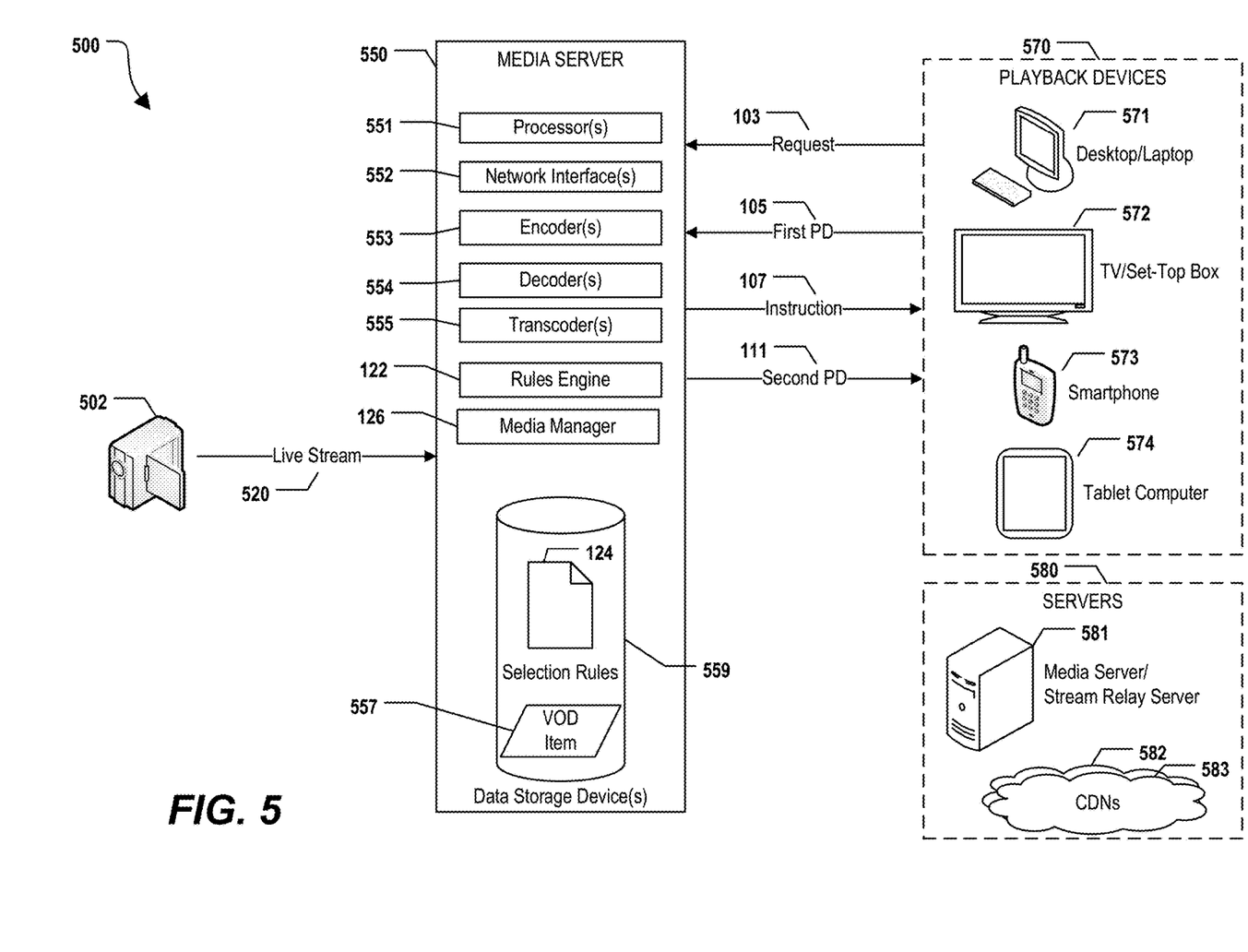
FIG. 5 is a diagram of a particular aspect of a system that is operable to select a content source based on performance data.

FIG. 5 is a diagram to illustrate a particular aspect of a system 500 that is operable to select a content source based on performance data. The system 500 includes a media server 550 that is configured to send data to and receive data from various other devices (e.g., via a network, such as a local area network (LAN) or the Internet). For example, the media server 550 may communicate with one or more playback devices 570 (e.g., devices that are configured to receiving streaming content) and one or more other servers/networks 580. In an illustrative aspect, the media server 550 is the server 120 of FIG. 1. In an illustrative aspect, the playback devices 570 include the destination device 150, the second destination device 190, the third destination device 192, or a combination thereof. It should be noted that the illustrated playback devices 570 are examples. The playback devices 570 may include additional client devices and/or other types of devices capable of requesting and playing media streams. In an illustrative aspect, the other servers/networks 580 include the content server 180, one or more devices (e.g., servers) of the cloud service 170, the media provider 194, or a combination thereof.

The media server 550 may include one or more processors 551 and various components that are executable by the processor(s) 551. The media server 550 may correspond to or include software application(s) that perform media serving or processing, hardware systems (e.g., servers) that support or perform media serving and processing, or any combination thereof. Thus, various operations described with reference to the media server 550, or components thereof, may be implemented using hardware, software (e.g., instructions executable by the processor(s) 551), or any combination thereof. In an illustrative aspect, the media server 550 includes the media manager 126 configured to perform media serving or processing.

The media server 550 may include one or more network interfaces 552. For example, the network interface(s) 552 may include input interface(s) and output interface(s) that are configured to receive data and to send/route data (e.g., media streams or media content), respectively. In a particular aspect, the network interface(s) 552 may be wired and/or wireless interfaces that enable the media server 550 to communicate data via a network, such as a media delivery network (e.g., the network 160 of FIG. 1). For example, the network interface(s) 552 may include an Ethernet interface, a wireless interface compatible with an Institute of Electrical and Electronics Engineers (IEEE) 502.11 (e.g., Wi-Fi) protocol, or other wired or wireless interface. In an illustrative aspect, the network interface(s) 552 include the receiver 130, the transmitter 132, or both, of FIG. 1.

The network interface(s) 552 may be configured to receive one or more media streams, such as an illustrative live media stream 520 from a capture source 502 (e.g., a camera). In a particular aspect, the live media stream 520 corresponds to the media stream 115 of FIG. 1. The live media stream 520 may include audio data, video data, text data, closed captioning (CC) data, and/or subtitle data. The network interface(s) 552 may also be configured to route/transmit data to the one or more of the playback devices 570 (e.g., a smartphone, a tablet computer, a laptop computer, a desktop computer, a set-top box, a television, a portable media player, a game console, etc.). In the aspect of FIG. 5, the playback devices 570 include a desktop/laptop computing device 571, a television (TV)/set-top box 572, a smartphone 573, and a tablet computer 574. The network interface(s) 552 may further be configured to transmit data to the one or more other servers/networks 580 (e.g., a media server, a stream relay server, a content distribution network, an edge server, etc.). In the aspect of FIG. 5, the other servers/networks 580 include a media server/stream relay server 581 and content distribution networks (CDNs) 582, 583. In a particular aspect, data transmitted to the playback devices 570 and to the servers/networks 580 includes video streams. The video streams may be associated with the same encoding format and transmission protocol or may be associated with different encoding formats and transmission protocols. In a particular aspect, generating the video streams includes performing video decoding, encoding, transcoding, and/or transmuxing operations at the media server 550 (e.g., to modify a video encoding format, an audio encoding format, a bit rate, an aspect ratio, packaging, etc. relative to the incoming media stream 520). In a transmuxing operation, encoded audio and video may be repackaged without modifying the encoded audio and video.

The media server 550 may include various components configured to perform stream processing functions. For example, the media server 550 may include one or more video processing components, such as encoder(s) 553, decoder(s) 554, and transcoder(s) 555, each of which may be implemented using hardware, software, or both. The decoder(s) 554 may decode data received by the media server 550. For example, the decoder(s) 554 may decode received streams (e.g., live audio-only, video-only, or audio-video streams). The encoder(s) 553 may encode data that is to be transmitted by the media server 550. The transcoder(s) 555 may be configured to perform bitrate conversion, CODEC conversion, frame size conversion, etc. Depending on a format of a received stream, a playback format supported by a requesting device, and/or transcoding parameters in use, a transcoding operation performed by the transcoder(s) 555 may trigger a decoding operation by the decoder(s) 554 and/or a re-encoding operation by the encoder(s) 553. In a particular aspect, parameters used by the transcoder(s) 555 are stored in one or more transcoding templates at the media server 550. The encoder(s) 553, decoder(s) 554, and transcoder(s) 555 may thus enable the media server 550 to process data in accordance with multiple coding technologies and protocols.

For example, the media server 550 may support video encoding types including, but not limited to, H.264, on2® VP-based encoding (on2 is a registered trademark of Google Inc. of Mountain View, Calif.), Sorenson Spark® (Sorenson Spark is a registered trademark of Sorenson Media, Inc. of Salt Lake City, Utah), Screen video, Screen video 2, motion picture experts group (MPEG) 2 (MPEG-2), and MPEG-4 Part 2. The media server 550 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The media server 550 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The media server 550 may also support real time messaging protocol (RTMP) (and variants thereof), real-time streaming protocol (RTSP), real-time transport protocol (RTP), MPEG-2 transport stream (MPEG-TS), and WOWZ. Additional audio formats, video formats, coder/decoders (CODECs), and/or protocols may also be supported, and it is to be understood that the techniques of the present disclosure do not require any specific protocol or set of protocols for operation.

The media server 550 may include one or more data storage devices 559 (e.g., random access memory (RAM), disk-based storage, etc.). The data storage device(s) 559 may store stream data (e.g., frames of a live video stream), files, closed caption data, images (e.g., to be overlaid on top of a video stream), and other data. In a particular aspect, the data storage device(s) 559 store a video on demand (VOD) item 557. The VOD item 557 may include audio data, video data, text data, closed captioning (CC) data, and/or subtitle data. For example, the VOD item 557 may be a movie or a television show. Alternately, the VOD item 557 may be stored remote from the media server 550 and may be accessible by the media server 550 via a network (e.g., the Internet). In an illustrative aspect, the VOD item 557 corresponds to the media stream 115 of FIG. 1.

The media server 550 also includes the rules engine 122. The media server 550 also stores (or has access to) the selection rules 124. In a particular aspect, the media server 550 supports selection of a content source based on performance data. For example, a destination device (e.g., one of the playback devices 570) sends the request 103 for the media stream 115 and the first PD 105 to the media server 550. Upon receiving the request 103, the rules engine 122 selects a content source (e.g., another one of the playback devices 570, the media server 550, or one of the other servers/networks 580) based on the first PD 105 and the second PD 111. The rules engine 122 is configured to select the content source (e.g., another one of the playback devices 570, the media server 550, or one of the other servers/networks 580) based on network conditions detected at the destination device, network conditions detected at the media server 550, and network conditions detected at one or more additional content sources, such as one or more of the playback devices 570, one or more of the servers/networks 580, or a combination thereof, as described with reference to FIGS. 1-2.

In a particular aspect, the media manager 126 generates (or updates) the second PD 111 in response to receiving the request 103. In a particular aspect, the media manager 126 generates (or updates) the second PD 111 prior to receiving the request 103. For example, the media manager 126 generates (or updates) the second PD 111 at various time intervals, in response to receiving performance data (e.g., the third PD 101 of FIG. 1) from another content source, or a combination thereof. The media manager 126 is configured to, in response to determining that the content source (e.g., another one of the playback devices 570 or one of the other servers/networks 580) is distinct from the media server 550, send the instruction 107 to the destination device indicating that the media stream 115 is to be requested from the content source, as described with reference to FIG. 1. The destination device is configured to, in response to receiving the instruction 107, send a second request to the content source and to receive the media stream 115 from the content source, as described with reference to FIG. 1. Alternatively, the rules engine 122 is configured to, in response to determining that the content source includes the media server 550 send the media stream 115 to the destination device, as described with reference to FIG. 1. The system 500 thus enables the destination device to receive the media stream 115 from a content source that is selected based on the first PD 105 and the second PD 111.

It should be noted that the order of steps described with reference to FIGS. 1-5 is to be considered illustrative, not limiting. In alternate aspects, the order of steps may be different. Further, one or more steps may be optional and/or replaced by other steps. In addition, one or more steps may be consolidated. In accordance with various aspects of the present disclosure, one or more methods, functions, and modules described herein may be implemented by software programs executable by a computer system. Further, implementations can include distributed processing, component/object distributed processing, and/or parallel processing.

Particular aspects can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the server 120, the destination device 150, the content server 180, the media provider 194, the second destination device 190, the third destination device 192, a server of the cloud service 170 of FIG. 1, the media server 550, the desktop/laptop computing device 571, the TV/set-top box 572, the smartphone 573, the tablet computer 574, the media server/stream relay server 581, a server (e.g., edge server) of the CDN 582, a server (e.g., edge server) of the CDN 583 of FIG. 5, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular aspect, the instructions can be embodied in a computer-readable or a processor-readable device. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage device. A computer-readable or processor-readable device is not a signal.

As used herein, a "live" stream may differ from a "video on demand" (VOD) stream. A VOD stream originates from, or corresponds to, content that is available in its entirety at a stream source when a packet of the VOD stream is sent.

For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)).

In a particular aspect, a method includes sending, from a device, a first request for a media stream to a server. The method also includes determining, at the device, first performance data. The method further includes receiving, at the device, second performance data from the server. The method also includes selecting, based on the first performance data and the second performance data, a content source that is distinct from the server. The method further includes sending, from the device, a second request for the media stream to the content source. The method also includes receiving the media stream at the device from the content source.

In another particular aspect, a server includes a receiver, a processor, and a transmitter. The receiver is configured to receive a request for a media stream from a device and to receive first performance data from the device. The processor is configured to determine second performance data and to select, based on the first performance data and the second performance data, a content source that is distinct from the server. The transmitter is configured to send an instruction to the device to request the media stream from the content source.

In another particular aspect, a computer-readable storage device stores instructions that, when executed by a processor, cause the processor to perform operations including sending, from a device, a first request for a media stream to a server. The operations also include determining, at the device, first performance data. The operations further include receiving, at the device, second performance data from the server. The operations also include selecting, based on the first performance data and the second performance data, a content source that is distinct from the server. The operations further include sending, from the device, a second request for the media stream to the content source. The operations also include receiving the media stream at the device from the content source.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

Although specific aspects have been illustrated and described herein, it should be appreciated that any subsequent arrangement designed to achieve the same or similar purpose may be substituted for the specific aspects shown. This disclosure is intended to cover any and all subsequent adaptations or variations of various aspects. Combinations of the above aspects, and other aspects not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single aspect for the purpose of streamlining the disclosure. This disclosure is not to be interpreted as reflecting an intention that the claimed aspects require more features than are expressly recited in each claim. Rather, as the following claims reflect, inventive subject matter may be directed to less than all of the features of any of the disclosed aspects.

The above-disclosed subject matter is to be considered illustrative, and not restrictive, and the appended claims are intended to cover all such modifications, enhancements, and other aspects, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A device comprising:
    a processor; and
    a memory storing instructions that, when executed by the processor, cause the processor to perform operations comprising:
        sending a first request for a media stream to a server;
        determining first performance data, wherein the first performance data indicates a first value of a first performance metric;
        receiving second performance data from the server, wherein the second performance data indicates a second value of a second performance metric of the server and a third value of the second performance metric of a content source that is distinct from the server;
        determining that a selection rule is satisfied in response to determining that:
            the first value fails to satisfy a performance threshold; and
            a difference between the second value and the third value satisfies an update threshold;
        selecting the content source in response to determining that the selection rule is satisfied;
        sending a second request for the media stream to the content source; and
        receiving the media stream from the content source.

2. The device of claim 1, wherein the first performance data indicates network conditions.

3. The device of claim 1, wherein the second performance data indicates first network conditions detected at the server, second network conditions detected at the content source, or a combination thereof.

4. The device of claim 1, wherein the content source is included in a peer-to-peer network.

5. The device of claim 1, wherein the content source is included in a content distribution network.

6. The device of claim 1, wherein the content source is included in a cloud service provider network.

7. The device of claim 1, wherein the operations further comprise receiving user input indicating the selection rule.

8. The device of claim 1, wherein the operations further comprise receiving the selection rule from a second device that is associated with a media provider.

9. The device of claim 1, wherein the first performance metric includes a network bandwidth, packet loss, a network protocol, or a combination thereof, and wherein the second performance metric includes a network load, a geographic distance, a network distance, a supported network protocol, or a combination thereof.

10. The device of claim 1, wherein the operations further comprise:
determining a first geographic distance between a first geographic location and a second geographic location of the server; and
determining a second geographic distance between the first geographic location and a third geographic location of the content source.

11. The device of claim 10, wherein the first value indicates a network bandwidth, wherein the second value indicates the first geographic distance, and wherein the third value indicates the second geographic distance.

12. A method comprising:
receiving a request for a media stream from a device and receiving first performance data from the device, wherein the first performance data indicates a first value of a first performance metric;
determining second performance data indicating a second value of a second performance metric of a receiver, a transmitter, or both, and determining whether a content source that is distinct from a server is included in a particular type of network;
determining that a selection rule is satisfied in response to determining that:
the first value fails to satisfy a performance threshold;
the second value satisfies an update threshold; and
the content source is included in the particular type of network;
selecting the content source in response to determining that the selection rule is satisfied; and
requesting the media stream from the content source.

13. The method of claim 12, wherein the first performance data indicates network conditions detected at the device, and wherein the second performance data indicates network conditions detected at the receiver, the transmitter, or both.

14. The method of claim 12, wherein the receiver receives third performance data from the content source, wherein the third performance data indicates network conditions detected at the content source, and wherein the second performance data includes the third performance data.

15. The method of claim 12, wherein the second value is based on a comparison of first network conditions detected at the content source and second network conditions detected at the receiver, the transmitter, or both.

16. The method of claim 15, wherein the second performance data indicates the first network conditions and the second network conditions.

17. The method of claim 12, further comprising:
receiving a user input indicating the selection rule, the selection rule indicating the performance threshold and the update threshold; and
storing the selection rule.

18. The method of claim 12, further comprising:
receiving the selection rule from a second device that is associated with a media provider, the selection rule indicating the performance threshold and the update threshold; and
storing the selection rule.

19. A computer-readable storage device storing instructions that, when executed by a processor, cause the processor to perform operations comprising:
receiving a request for a media stream from a device and receiving first performance data from the device, wherein the first performance data indicates a first value of a first performance metric;
determining second performance data indicating a second value of a second performance metric of a receiver, a transmitter, or both, and determining whether a content source that is distinct from a server is included in a particular type of network;
determining that a selection rule is satisfied in response to determining that:
the first value fails to satisfy a performance threshold;
the second value satisfies an update threshold; and
the content source is included in the particular type of network;
selecting the content source in response to determining that the selection rule is satisfied; and
requesting the media stream from the content source.

20. The computer-readable storage device of claim 19, wherein the operations further comprise receiving third performance data from the content source, wherein the third performance data indicates network conditions detected at the content source, and wherein the second performance data includes the third performance data.

\* \* \* \* \*